United States Patent [19]
Kanno

[11] 4,159,752
[45] Jul. 3, 1979

[54] TRICYCLE

[75] Inventor: Nobuyuki Kanno, Iwata, Japan

[73] Assignee: Yamaha Hatsudoki Kabushiki Kaisha, Iwata, Japan

[21] Appl. No.: 841,754

[22] Filed: Oct. 13, 1977

[30] Foreign Application Priority Data

Oct. 14, 1976 [JP] Japan ............................. 51-137019[U]
May 28, 1977 [JP] Japan ............................. 52-69262[U]

[51] Int. Cl.² .......................... B60G 9/02; B60G 11/18
[52] U.S. Cl. .................................. 180/210; 280/282; 280/111
[58] Field of Search ............... 280/111, 112 R, 112 A, 280/282, 283; 180/25 R, 27

[56] References Cited

U.S. PATENT DOCUMENTS

| 2,966,951 | 1/1961 | Lang | 180/25 R |
| 3,583,727 | 6/1971 | Wallis | 280/283 |
| 3,605,929 | 9/1971 | Rolland | 280/282 X |
| 3,938,609 | 2/1976 | Kensaku et al. | 180/27 |
| 3,952,822 | 4/1976 | Udden et al. | 180/27 X |

Primary Examiner—Richard A. Bertsch
Assistant Examiner—Michael Mar
Attorney, Agent, or Firm—Koda and Androlia

[57] ABSTRACT

A tricycle including a front frame, front wheel provided on the front frame, a rear frame provided with two adjacent and parallel wheels coupled to the front frame such that the center of the front frame is offset to one side of the tricycle relative to the center of the rear frame Furthermore, if the tricycle is motorized, the motor is coupled to the rear frame such that the center of gravity of the motor is offset to another side of the tricycle relative to the center of the rear frame.

5 Claims, 5 Drawing Figures

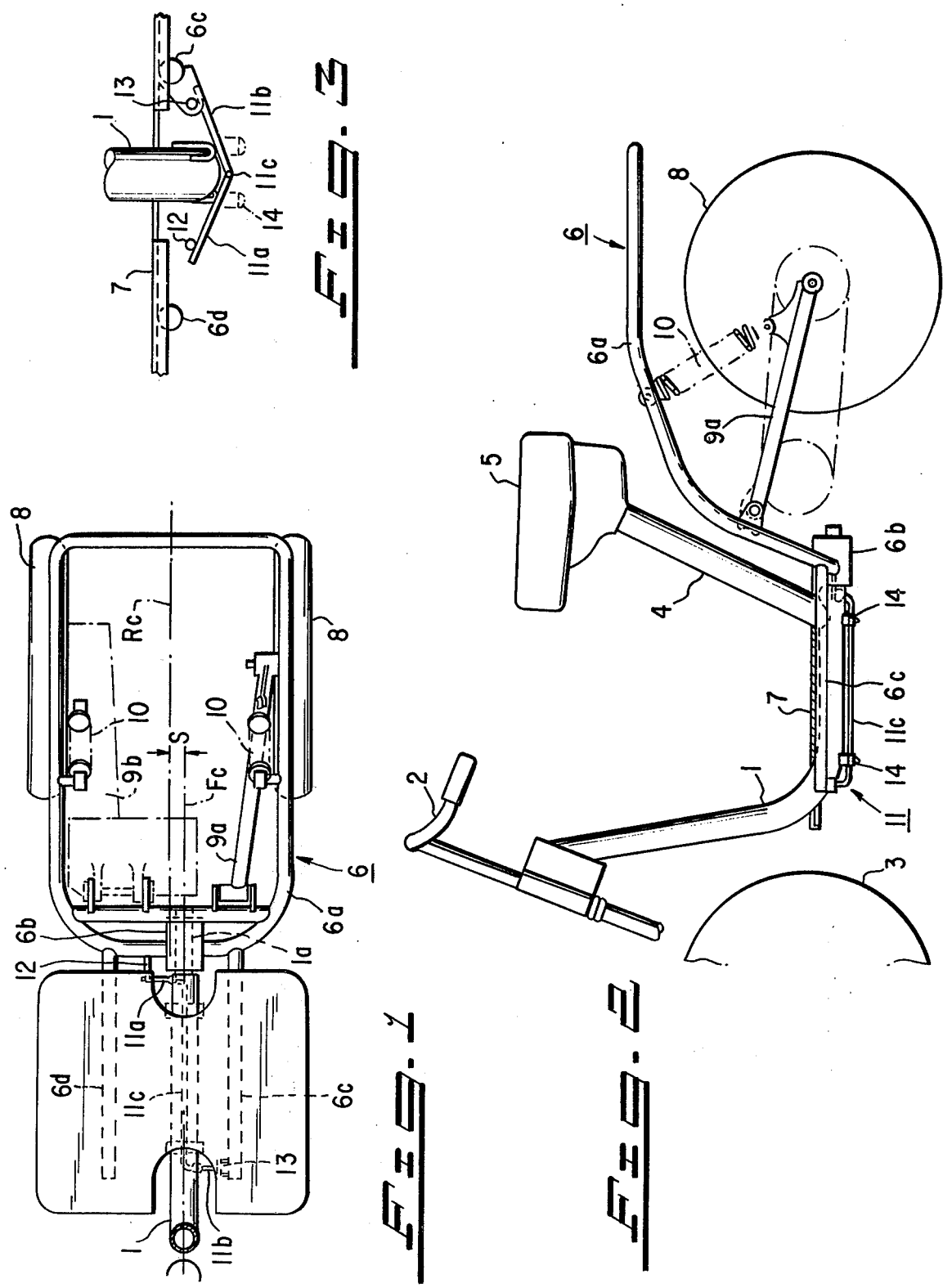

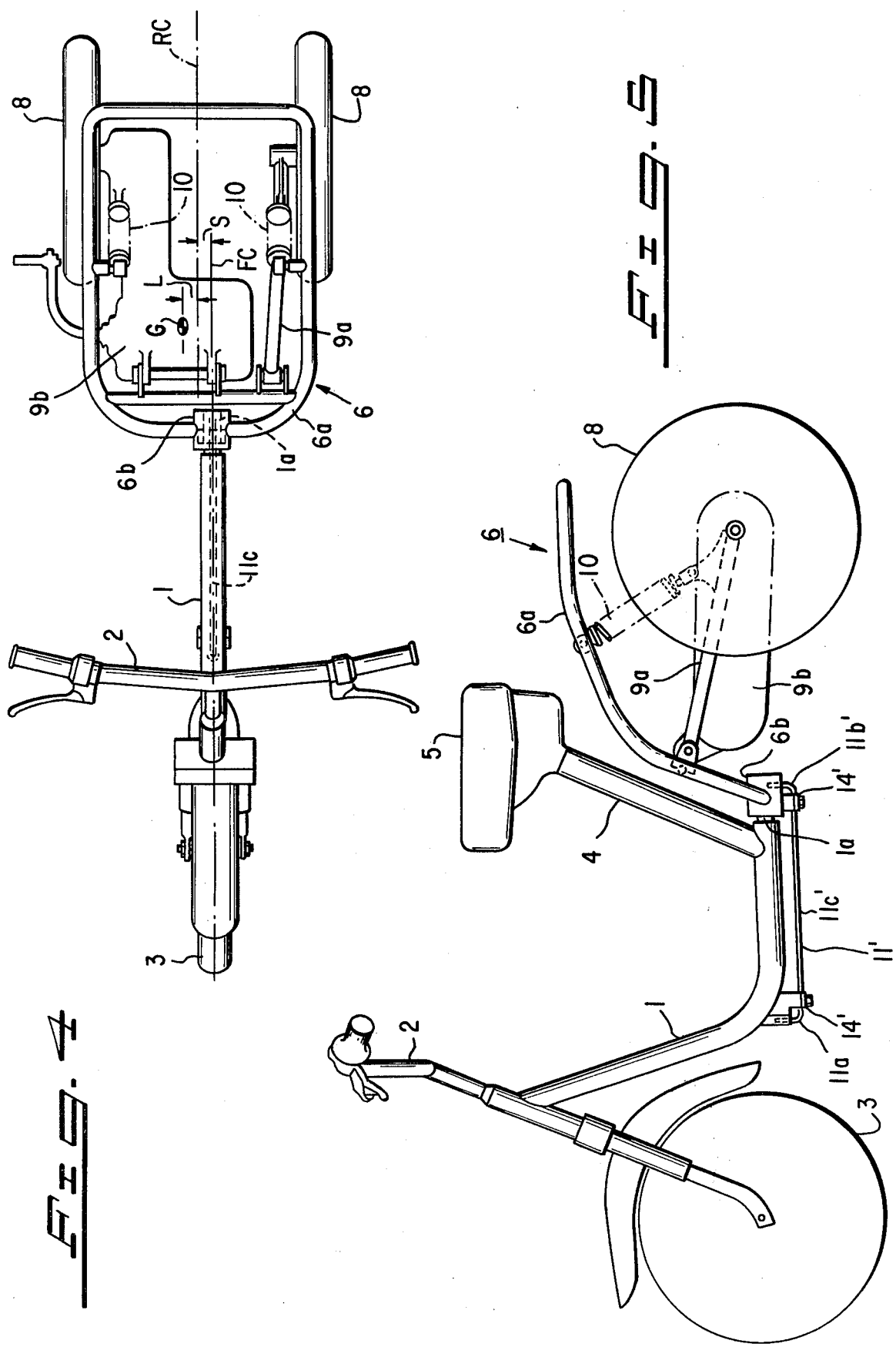

TRICYCLE

BACKGROUND OF THE INVENTION

1. Field of Invention

The present invention relates to tricycles and more particularly to motorized tricycles.

2. Prior Art

Generally tricycles can be categorized into two types. The first is the so-called inclined front frame tricycle whose front and rear frames are movably coupled axially in the longitudinal direction of the tricycle. The other type is one whose front and rear frames comprise an integral body such that the front frame cannot be moved independently of the rear frame.

These prior-art tricycles have a common structure wherein the center of the front frame is aligned with the center of the rear frame on a straight axial line such that the distance between the two rear wheels or the lateral width of the rear frame is equally divided to the right and to the left side of the center of the tricycle by the center line of the front frame. As result of the center line of the front frame lying along the center line of the rear frame, the driver of the tricycle while standing with his feet on the ground off of the tricycle and pushing the tricycle while holding the handle bars sometimes inadvertently hits his leg against the rear frame or rear wheel. Such a tendency is particularly noticeable with the tricycle whose rear wheels have a wide tread to increase riding stability and/or increase loading area.

SUMMARY OF THE INVENTION

Accordingly as a general object of the present invention is to provide a tricycle which substantially reduces the risk of the driver accidentally hitting his leg against the rear frame or rear wheel.

It is still another object of the present invention to provide a tricycle with a simple structure which is easy to manufacture and low in cost.

In keeping with the principles of the present invention the objects are accomplished by a unique tricycle including a front frame, a front wheel rotatably coupled to the front frame, a rear frame provided with two adjacent and parallel wheels rotatably coupled to the rear frame and the rear frame coupled to the front frame such that the center of the front frame is offset to one side of the tricycle relative to the center of the rear frame. Furthermore, in a preferred embodiment, if the tricycle is motorized, the motor is coupled to the rear frame such that the center of gravity of the motor is offset to another side of the tricycle relative to the center of the rear frame thereby increasing the riding stability, preventing a parked vehicle from tilting and preventing uneven wear of the rear tires.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which:

FIG. 1 is a plan view of the tricycle in accordance with the teachings of the present invention;

FIG. 2 is a side view of the tricycle of a FIG. 1;

FIG. 3 is a partial front view illustrating the torsion mounting bar of the tricycle of FIG. 1;

FIG. 4 is a top plan view illustrating a second embodiment of a tricycle in accordance with the teachings of the present invention; and FIG. 5 is a side view of the embodiment of FIG. 4.

DETAILED DESCRIPTION OF THE INVENTION

Referring more particularly to the Figures, shown in FIG. 1 is a plan view of a tricycle in accordance with the teachings of the present invention, shown in FIG. 2 is a side view of the embodiment of FIG. 1 and shown in FIG. 3 is a partial front view illustrating the torsion bar mounting for the embodiment of FIG. 1. FIGS. 1, 2 and 3 contain sufficient detail to explain the inter connection and operation of an embodiment of a tricycle in accordance with the teachings of the present invention and the following description will be made in reference thereto.

Referring to the Figures, the swingable front frame 1 is rotatably coupled to the rear frame 6 as described hereinbelow. In general, the front frame 1 is coupled to the rear frame 6 such that the horizontal center Fc of the front frame 1 is offset a distance S from the horizontal center Rc of the rear frame 6 to one side of the tricycle (i.e. the side from which the rider gets on or off).

Coupled to the front frame 1 is a front wheel 3, handle bar 2, and a seat tube 4 whose lower end is mounted to the rear end of the front frame 1 and whose upper end is coupled to a driver's seat 5.

The rear frame 6 includes a frame 6a, a bearing 6b which rotatably holds a coupling shaft 1a of the front frame 1 and footrest holding tubes 6c and 6d. The bearing 6b is provided at a distance S from the center Rc of the frame 6. A footrest 7 is fixed to footrest holding tubes 6c and 6d. Footrest 7 is provided on the footrest holding tubes 6c and 6d such that its horizontal center corresponds to the horizontal center Rc of the rear frame 6.

One of the rear wheels 8 is coupled to the rear frame 6 via rear wheel holding arm 9a and shock absorber 10. The other of the rear wheels 8 is coupled to the rear frame 6 via a motor 9b and the shock absorber 10. Namely, a motor 9b is provided on the rear frame 6 so as to be movable in a vertical direction and the lower end of the shock absorber 10 is connected to the part of the motor 9b. The rear wheel 8 is coupled directly to the output shaft which projects in a lateral direction from the rear part of the motor 9b and is driven thereby.

Numeral 11 is a torsion bar configuration which resiliently holds the front frame 1 to the rear frame 6. Both ends of the torsion bar 11 are bent to form L-shaped arm 11a and 11b. When coupling the arms 11a and 11b to the rear frame 6, a torsional weight is applied to the torsion bar 11 so that the bar 11c is held by the front frame 1. More specifically, at the time of mounting, the torsion bar 11 is torsionally bent in the shape of the crank as shown in FIG. 3. Then the arms 11a and 11b are coupled respectively to each of the coupling pins 12 and 13 provided on the rear frame 6a and foot-rest support tube 6c, while the bar 11c is held to the front frame 1 by the holder 14. The holder 14 is mounted to the lower side of the front frame 1 so as to rotatably hold the torsion bar 11. As aforedescribed, the front frame 1 in the present invention is coupled to the rear frame 6 via shaft 1a and bearing 6b such that the center of the front frame 1 is offset a distance S from the center of the rear frame Rc to one side of the tricycle. Therefore, since the front frame 1 is provided closer to the side of the rider while the rider is standing on the ground, the rear frame is relatively further away from the rider and the risk of the rider accidentally hitting his leg against the rear frame or the rear wheel is diminished.

In the embodiment described in FIGS. 1, 2 and 3, since the center of the front frame is displaced from the center of the rear frame 6 and the load is unequally distributed to the both of the wheels, the stability in motorized tricycles of this type is somewhat reduced and the wear on the tires 8 is uneven. To overcome this difficulty, the tricycle of the present invention is modified as described in the embodiment illustrated in FIGS. 4 and 5. Since the embodiment of FIGS. 4 and 5 is similar to that described in FIGS. 1, 2 and 3, like elements are given like referenced numerals and a description of interconnection operation will be omitted.

Referring more particularly to the Figures, the front frame 1 is rotatably coupled to the rear frame 6. Generally, the coupling is arranged in figures such that the horizontal center Fc of the front frame is offset a distance S from a horizontal center Rc of the rear frame 6 towards one side of the tricycle (i.e. the side from which the rider gets on or off). The rear frame 6 is rotatably coupled to the front frame 1 by a bearing 6b for rotatably holding a coupling shaft 1a of the front frame 1. The bearing 6b is provided at a distance S from the center Rc of the rear frame 6a towards the one side of the tricycle.

A motor consisting of a gasoline internal combustion engine 9b is also provided on the rear frame 6a and holds the rear wheels 8 and is swingable as well as the rear wheel holding arm 9a in a vertical direction. The motor 9b is coupled to the frame 6 such that the center of the gravity G of the motor 9b is displaced a distance L from the center Rc of the rear frame 6 towards another side of the tricycle (i.e. of the opposite side from that of the front frame center Fc).

The front frame 1 is resiliently coupled to the rear frame 6 by a torsion bar 11'. The torsion bar 11' is bent such that it has two L-shaped arms 11a' and 11b' which are coupled respectively to the front frame 1 and the rear frame bearing 6b. The straight portion 11c' of the torsion bar 11' is rotatably supported by holders 14' provided on the front frame 1 and the rear frame bearing 6b.

In operation since the center Fc of the front frame 1 is offset a distance S to the one side from the center Rc of the rear frame 6 and the center of gravity G of the motor 9b is offset a distance L from the center Rc of the rear frame 6 to the other side, the load is distributed equally between the two rear wheels 8 thereby increasing the stability of the tricycle and increasing the evenness of wear between the two tires 8.

Although the above embodiments have been described in terms of so-called inclined front frame three-wheeler in which the front frame is movably coupled to the rear frame, the present invention maybe also applied to a tricycle whose front and rear frames are formed as an integral body. Moreover, a gasoline internal combustion engine is utilized in the present invention, but an electric motor together with a battery could be utilized. If an electric motor is utilized together with a battery, it is clearly understood that the center of the gravity of the combined battery and an electric motor must be displaced the required distance L.

As is clear from the above description, since the center of gravity of the motor is offset to the other side in relation to the center of the rear frame, an equal distribution of the load upon the rear wheels is achieved which improves the riding stability, prevents tilting of the vehicle when parked and eliminates uneven wear on the tires.

In all cases, it is understood that the above-described embodiments are merely illustrative of but a few of the many possible specific embodiments which represent the application of the principles of the present invention. Numerous and varied other arrangements can be readily devised by those skilled in the art without departing from the spirit and the scope of the invention.

I claim:

1. A tricycle comprising:
    a rear frame having provided thereon two rear wheels and having a central longitudinal axis;
    a front frame rotatably and resiliently coupled to said rear frame at a single point such that a longitudinal axis of said front frame is offset to one side of said central longitudinal axis of said rear frame;
    a seat coupled to said front frame;
    and a motor coupled to said rear frame and driving said rear wheels, said motor further being coupled to said rear frame such that a center of gravity of said motor is offset to another side of said tricycle relative to said central longitudinal axis of said rear frame whereby the stability of the tricycle is increased.

2. A tricycle according to claim 1 wherein said motor is an internal combustion engine.

3. A tricycle according to claim 2 wherein said front frame is resiliently coupled to said rear frame by a torsion bar.

4. A tricycle according to claim 1 wherein said engine drives said rear wheel on said other side.

5. A tricycle according to claim 4 wherein said motor is provided on the rear frame so as to be movable in a vertical direction and the rear wheel on said other side is held by said motor.

* * * * *